Sept. 22, 1970　　M. H. BURCKHARDT ET AL　　3,529,871
INSTALLATION FOR PREVENTING SKIDDING DURING
BRAKING OF MOTOR VEHICLES Filed Dec. 27, 1968　　　　　　　　　　　2 Sheets-Sheet 1

INVENTORS
MANFRED H. BURCKHARDT
HELLMUT KROHN

BY *Craig & Antonelli*

ATTORNEYS

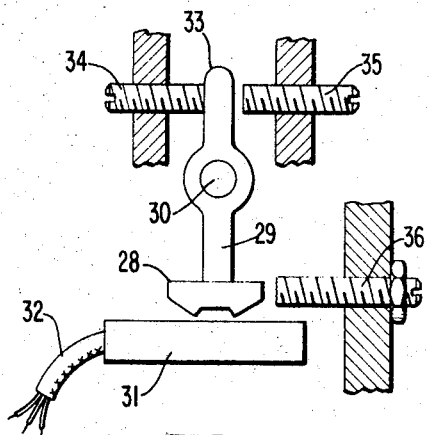
FIG. 3
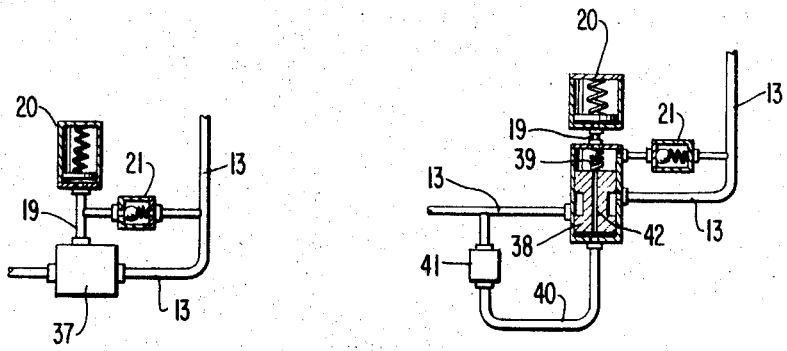
FIG. 4
FIG. 5

3,529,871
INSTALLATION FOR PREVENTING SKIDDING
DURING BRAKING OF MOTOR VEHICLES
Manfred H. Burckhardt, Waiblingen, and Hellmut Krohn,
Liebersbronn, Kries Esslingen, Germany, assignors to
Daimler-Benz Aktiengesellschaft, Stuttgart-Unterturkheim, Germany
Filed Dec. 27, 1968, Ser. No. 787,433
Claims priority, application Germany, Dec. 28, 1967,
1,630,405
Int. Cl. B60t 8/24
U.S. Cl. 303—21                                    25 Claims

ABSTRACT OF THE DISCLOSURE

An installation for preventing skidding during braking of motor vehicle with the aid of pulse-controlled intervention into the brake-force, in which a magnetic valve is arranged in each brake-pressure line leading to the rear wheel and is connected with a pulse-transmitter operable only upon transverse acceleration in a given direction; upon energization, the magnetic valve arrangement will disconnect the wheel brake from the brake-pressure line and instead, will connect the wheel brake with a spring loaded accumulator which, in turn, is connected with the brake-pressure line by way of a check valve.

---

The present invention relates to an installation for the prevention of the skidding during braking of motor vehicles with the aid of pulse-controlled interventions into the brake force.

It has already been proposed to improve the banking or curve position of a vehicle in that the rear wheel disposed on the curve inside and most strongly relieved, is not utilized for the transmission of the brake force. This means that according to this prior art proposal, during braking in the curve, the rear wheel on the inside of the curve is not acted upon by the brake force. The frictional engagement of this wheel can therefore be utilized exclusively for the absorption of lateral guide forces.

On the other hand, it is also known that during a straight drive, a moment sum of the brake forces about the vehicle vertical axis results at the rear axle by an overbraked wheel. The resulting transverse force on the rear axle is directed toward the overbaked wheel and the vehicle ear end breaks out in the direction of this overbraked wheel.

The present invention aims at avoiding the described skidding action and at creating an instlllation by means of which a equalization of this skidding action is possible. In connection therewith, of primary significance are essentially inter alia, the response velocity and response accuracy of the installation. For if one assumes by approximation that the vehicle rotates about the front axle center, then there results, for example, with a transverse acceleration of 0.3 g (m/sec.$^2$) at the vehicle rear end already after one second a rotation of the vehicle through an angle of 3.75 degrees.

The underlying problems are solved in accordance with the present invention in that a magnetic valve arrangement is arranged in the brake-pressure line leading to each rear wheel, which is operatively connected with an electrical pulse transmitter responding only to the respective direction of the transverse acceleration, and in that upon exceeding an adjustable transverse acceleration at the corresponding pulse transmitter, the wheel brake of the associated side is adapted to be disengaged by the respective magnetic valve arrangement from the brake-pressure line and is adapted to be connected with a spring-loaded tank or accumulator which, in its turn, is connected by way of a check valve to the brake-pressure line leading to the magnetic valve arrangement.

It is possible by the installation of the present invention to decrease more or less with sufficient rapidity and accuracy the brake-force at the rear wheel disposed opposite the side where breaking-out occurs. The brake-force at the breaking-out rear wheel then produces a returning moment which counteracts or opposes the break-out direction. As soon as the transverse acceleration again drops below the adjusted value, the brake-force is again available also at the more or less disconnected wheel.

According to one embodiment of the present invention, a common tank or accumulator is provided for the magnetic valve arrangement at both rear wheels and is connected by way of a common check valve with a brake-pressure line leading to a magnetic valve arrangement. A simplification in the construction is achieved thereby. A significant further development of the inventive concept essentially consist in that the tank or accumulator is constructed as differential tank or accumulator and, in addition to the spring force, is adapted to be loaded by the brake-pressure. In connection therewith the present invention proposses in detail that the tank or accumulator magnetic valve arrangement while the cylinder space associated with the large area is connected with the magnetic valve arrangement while the cylinder space coordinated to the small area is connected with the barke-pressure line.

It is achieved by this differential piston arrangement that the brake-pressure does not decrease to zero but is decreased in a predetermined ratio. This ratio is different for each type of vehicle and is in predetermined relationship to the tendency to break out on the part of this respective type of vehicle, which in turn depends on different factors, for example, on the axle load distribution, the wheel base and others. The surface or area difference between the two piston surface will thereby be essentially the larger, the larger the tendency on the part of the vehicle to break-out.

A further significant feature of the present invention resides in that the tank or accumulator volume amounts to a multiple, preferably to four to six times the actuating volume of each wheel brake. It is possible in this manner to assure the equalization of the skidding movement also during repeated braking recurring rapidly one after the other.

In one preferred type of construction of the present invention the electric pulse transmitter consists of a permanent magnet suspended swingingly about a vehicle longitudinal axis and of a conventional contactless switch coordinated to the permanent magnet at the least possible distance, and furthermore one direction of the deflection of the pendulum is blocked by an abutment. The pendulum therefore responds only to one transverse direction and is blocked in passing through the zero position. A better damping and a better adjustability is achieved thereby. Consequently, two such types of pulse transmitters are connected in series on opposite sides of the vehicle for the entire vehicle.

In particular, the present invention then further proposes that one adjusting screw each is coordinated to or associated with the pendulum on both sides, whose one adjusting screw serves for the adjustment of the switching path. Furthermore, a steel adjusting screw is coordinated to the swingingly suspended permanent magnet on the blocked abutment side. In this manner, the respsonse acceleration of the pendulum can be adjusted and a damping can be achieved. The closer this steel adjusting screw comes to the pendulum the greater becomes the response value of the pendulum.

In one type of construction according to the present invention each magnetic valve arrangement consists of a two-way valve closing upon current energization and disposed in the brake-pressure line leading to the wheel brake and of a two-way valve, opening upon current energization and disposed in the line leading from the wheel brake to the tank or accumulator. In another type of construction according to the present invention, each magnetic valve arrangement consists of a three-way valve which under current energization switches the wheel brake from the brake-pressure line to the storage tank line. Finally, a control piston may also be provided in each brake-pressure line which is held by a spring force in its open position and which is adapted to be moved into its closing position by actuation with the brake-pressure by way of the magnetic valve opening under current energization. The control piston is thereby appropriately provided with a longitudinal bore and is connected on the side thereof acted upon by the spring with the tank or accumulator. A line is branched off from the brake-pressure line between the control piston and wheel brake, which leads back to the control piston by way of the magnetic valve.

Since one cannot directly the magnetic valves by means of the described pulse transmitter, the present invention prefers the inter-position of an amplifier of conventional construction between these two parts. The amplifier may consist, for example, in a conventional manner of transistors.

Accordingly, it is an object of the present invention to provide an installation for preventing the skidding during braking of motor vehicles which avoids by simple means, the aforementioned short-comings and drawbacks encountered in the prior art.

Another object of the present invention resides in an anti-skid installation for the prevention of skidding of vehicles during braking which is simple in construction, reliable in operation and capable of proper adjustment.

A further object of the present invention resides in an installation for preventing the skidding during braking of motor vehicles which is characterized by completely satisfactory rapidity and accuracy in response and performance.

Still a further object of the present invention resides in an antiskid installation of the type described above, in which the brake-pressure is decreased at the desired rear wheel only at a predetermined ratio thereby precluding a decrease of the brake-pressure to zero.

Another object of the present invention resides in an antiskid installation of the type described above which performs satisfactorily even under repeated, rapidly recurring braking operations.

These and further objects features and advantages of the present invention will become more obvious from the following description when taken in connection with the accompaying drawing which shows, for purposes of illustration only, several embodiments in accordance with the present invention and wherein.

FIG. 3 is a partial schematic view of the construction of a pulse-transmitter in accordance with the present invention, and FIGS. 4 and 5 are schematic views, partially in cross section of two embodiments of a magnetic valve arrangement in accordance with the present invention.

Figure 1:
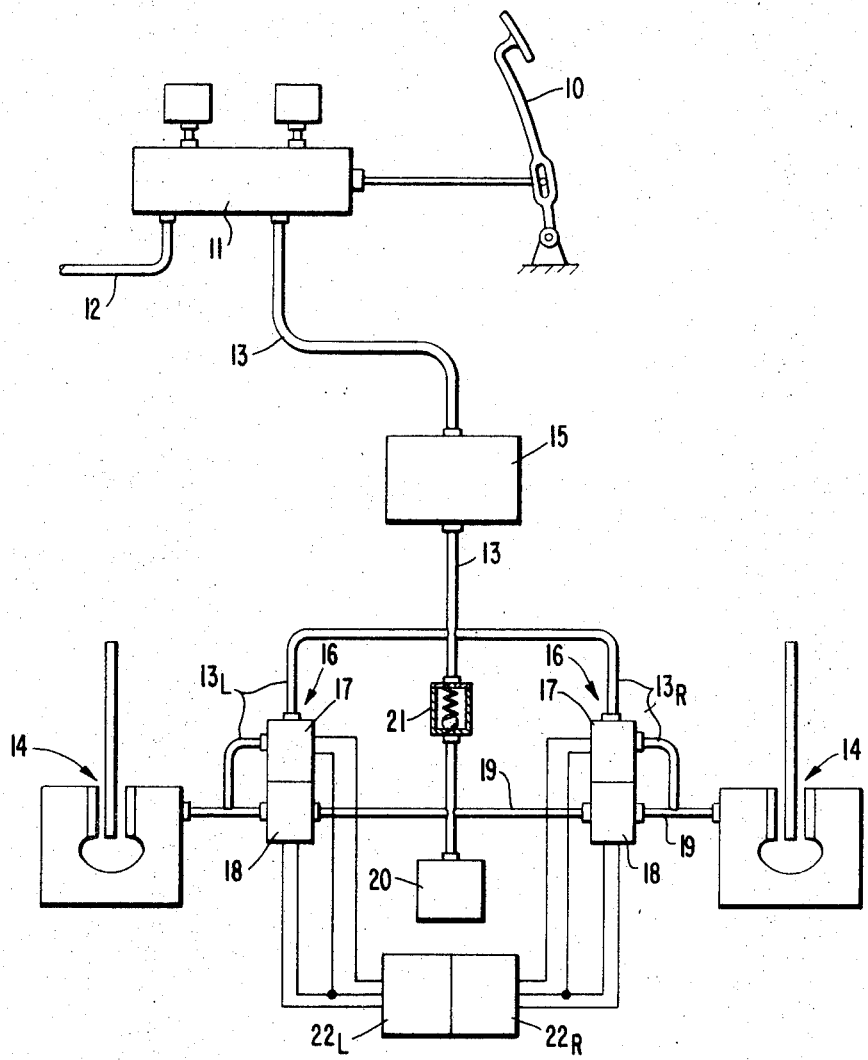
FIG. 1 is a schematic block diagram of an anti-skid installation in accordance with the present invention.

Referring now to the drawing wherein like reference numerals are used throughout the various view to designate like parts, and more particularly to FIG. 1, in the installation of this figure the master cylinder 11 is actuated in a conventional manner by the brake pedal 10; the line 12 leads from the master cylinder 11 to the front wheels (not shown) and the lines 13 to the rear wheel brakes generally designated by reference numeral 14. The line 13 thereby leads to the rear wheel brakes by way of a brakes-force regulator 15 of conventional construction. Downstream of the brake-force regulator 15, the line 13 splits into two line branches $13_L$ and $13_R$. Since the construction of both sides is identical, only one side will describe more fully hereinafter.

The brake-pressure line $13_R$ leads to corresponding rear wheel brake 14 by way of a magnetic valve arrangement generally designated by reference numeral 16 which consists of two magnetic valves 17 and 18. Both magnetic valves 17 and 18 are constructed as two-way valves. The first mentioned magnetic valve 17 is disposed in the brake-pressure line $13_R$ and is constantly open without valve 18 is disposed in a tank or accumulator line 19 which leads from the brake-pressure line $13_R$ between the magnetic valve arrangement 16 and the wheel brake 14 to the tank or accumulator 20. This valve 18 is constantly closed without current, i.e., is closed upon deenergization. The tank or accumulator 20 is spring-loaded and is so dimensioned in its volume that it can accommodate about 4 to 6 times the actuating volume at each wheel brake. The tank or accumulator 20 is operatively connected by way of a check valve 21 with the brake-pressure line 13 or with one of the two brake-pressure lines $13_R$ or $31_L$.

Each magnetic valve arrangement 16 is controlled by a respective pulse transmitter $22_R$ and $22_L$ which together are arranged as far back in the vehicle rear section as possible. The pulse transmitter $22_R$ thereby responds to the transverse acceleration directed toward the left and the pulse transmitter $22_L$ to the transverse acceleration directed toward the right. Upon exceeding a predetermined value of this transverse acceleration, the respective pulse-transmitter in the respective magnetic valve arrangement shifts or switches over the two magnetic valves 17 and 18, i.e., the magnetic valve 17 is closed under current or upon energization whereas the magnetic valve 18 is then opened under current or upon energization.

If a motor vehicle provided with the described installation breaks out with the vehicle rear section, for example, toward the left during braking, then the pulse transmitter $22_R$ responds if the adjusted response value is exceeded. The magnetic valve 17 is closed thereby, i.e., the right wheel brake 14 is no longer supplied with any brake pressure. Simultaneously therewith, the magnetic valve 18 is opened and the pressure present in the wheel brake cylinder on the right vehicle side is able to reduce itself by way of the tank line 19 into the tank or accumulator 20 against the spring present thereat. The brake-force at the right rear wheel thereby decreases to a value which is determined by the tank spring (not shown). Consequently, the brake moment produces at the left rear wheel—whose brake remains fully actuated as before—a moment about the vehicle vertical axis which again rotates the vehicle back into its straight driving direction. As soon as the response value of the transverse acceleration disappears, the pulse transmitter $22_R$ again returns to its normal position and the magnetic valve arrangement 16 is now shifted back to its original position. This means the right rear wheel now again receives brake pressure. The operation is exactly the same in the opposite direction, only referred to the other side. As soon as the brake pedal 10 is no longer actuated, i.e., the pressure in the line 13 decreases, the spring of the tank or accumulator 20 displaces the brake fluid contained in the same back into the brake-pressure line 13 by way of the check valve 21.

Figure 2:
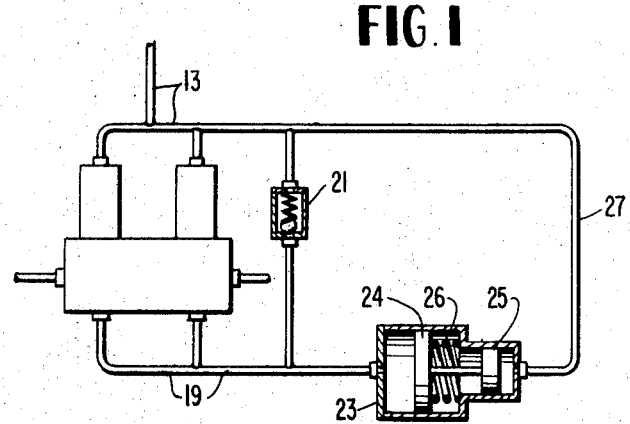
FIG. 2 is a schematic diagram of a differential accumulator in accordance with the present invention.

According to FIG. 2, the magnetic valve arrangement is constructed analogously in the same manner. The tank or accumulator lines 19 of both magnetic valve arrangements lead to a common tank or accumulator 23 which is constructed as differential accumulator. It contains within a cylinder two pistons 24 and 25 of different diameter which are acted upon by a spring 26. The cylinder space accommodating the larger piston 24 is connected with the accumulator line 19 and with the check valve 21 whereby the latter leads back in the described manner to the brake-pressure line 13. The cylinder space accommodating the smaller piston 25 is in communication by way of a connecting line 27 with the brake-pressure line 13. With this differential accumulator the brake force can be reduced therefor only in a predetermined ratio to the full brake pressure. This ratio is determined by the area difference of the pistons 24 and 25. As to the rest the operation is exactly the same as in connection with the installation according to FIG. 1.

According to FIG. 3, the pulse transmitter $22_R$ or $22_L$ is constituted by a permanent magnet 28 which is swingingly suspended at a pendulum 29 about a vehicle longitudinal axis 30. At a very slight distance below the permanent magnet 28 is arranged a conventional commercially available contactless switch 31 whose construction is known as such and therefore not described in detail herein. The switch 31 is connected by way of the lines 32 and by way of a conventional amplifier (not shown) with the magnetic valve arrangement 16 of the corresponding side.

On each side one adjusting screw 34 and 35 each is coordinated to or associated with the upper short lever arm 33 of the pendulum 29. The adjusting screw 34 serves as a fixed abutment which permits a pendulum deflection only toward one side. The other adjusting screw 35 serves for the adjustment of the shifting or switching path. An adjusting screw 36 made from steel is coordinated to or associated with the permanent magnet 28 on the blocked deflection side; i.e., therefore in the instant case on the side opposite the adjusting screw 34. The response acceleration is adjusted by means oft his adjusting screw 36, i.e., that value of the transverse acceleration at which the pendulum deflects.

This value is the higher the closer the screw 36 is approached to the permanent magnet 28. Additionally, the damping of the pendulum is adjusted by means of this screw 36.

The illustrated pendulum will respond to transverse movements toward the right. If the acceleration at which the pendulum deflects.

This value is the higher the closer the screw 36 is approached to the permanent magnet 28. Additionally, the damping of the pendulum is adjusted by means of this screw 36.

The illustrated pendulum will respond to transverse movements toward the right. If the acceleration thereby exeeds the adjusted value, then the pendulum deflects and produces in the switch 31 a pulse that is transmitted by way of the lines 32 under corresponding amplification to the magnetic valve arrangement 16 of the corresponding side and will produce thereat the effects already described.

According to FIG. 4, the magnetic valve arrangement is constituted by a three-way valve 37 which switches the wheel brake (not shown) during pulse transmission from the brake-pressure line 13 to the tank or accumulator line 19. As to the rest, the effect and operation is otherwise exactly the same as described hereinabove.

According to FIG. 5 a control piston 38 is disposed in the brake-pressure line 13 which in its illustrated normal position releases or opens up the brake-pressure line 13. The control piston 38 is, in its turn, loaded by a spring 39 and the connection of the accumulator line 19 as well as that of the check valve 21 is located also on this side. The other side of the control piston 38 is acted upon by a line 40 which is connected by way of a magnetic valve 41 with the brake-pressure line 13 between the control piston and the wheel brake (not shown). The magnetic valve 41 is normally closed. It is operatively connected with the pulse transmitter (not shown) in the described manner. A longitudinal bore 42 is provided in the control piston 38.

If a pulse transmission takes place in the described manner, then the magnetic valve 41 is opened. As a result thereof, the brake pressure reaches the lower side of the control piston 38 and lifts the same against the force of spring 39. As a result thereof, the brake-pressure line 13 is closed so that the brake receives no more pressure. The pressure still present in the brake can reduce itself by way of the line 40 and the longitudinal bore 42 into the accumulator line 19 and the accumulator or tank 20. In this manner the same effect is achieved as described above.

While we have shown and described several embodiments in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are within the scope of those skilled in the art.

We claim:

1. An installation for the prevention of the skidding during braking of motor vehicles with the aid of a pulse-controlled intervention into the brake-force, characterized by brake-pressure line means leading to the rear wheels, magnetic valve means arranged in the brake-pressure line means leading to each rear wheel, electric pulse transmitter means responsive only to the respective direction of the transverse acceleration, spring-loaded accumulator means, and means operatively connecting said magnetic valve means with said pulse transmitter means and with said accumulator means with said pulse transmitter means and with said accumulator means in such a manner that upon exceeding a predetermined transverse acceleration at the respective pulse transmitter means, the wheel brake of the associated side is adapted to be disconnected from the brake-pressure line means by the respective magnetic valve means and said accumulator means is operatively connected by way of a check valve means with the brake-pressure line means.

2. An instalaltion according to claim 1, wherein the transverse acceleration, at which the pulse transmitter means will respond, is adjustable.

3. An installation according to claim 2, wherein a common accumulator means is provided for the magnetic valve means at both rear wheels which is operatively connected by way of a common check valve means with a brake-pressure line means leading to a magnetic valve means.

4. An installation according to claim 3, wherein said accumulator means is constructed as differential accumulator, spring force means loading said differential accumulator means, and means for additionally loading said differential accumulator means by the brake-pressure.

5. An installation according to claim 4, wherein said accumulator means includes two-step piston means, the cylinder space coordinated to the piston means with the larger surface being operatively connected with a magnetic valve means and the cylinder space coordinated to the smaller piston surface being operatively connected with the brake-pressure line means.

6. An installation according to claim 5, wherein said accumulator means has a volume which amounts to a multiple of the actuating volume of each wheel brake.

7. An installation according to claim 6, wherein said volume amounts about to four to six times the actuating volume of each wheel brake.

8. An installation according to claim 1, wherein said electric pulse transmitter means includes permanent magnet means swingingly suspended about a vehicle longitudinal axis, and contactless switch means arranged relatively closely to said permanent magnet means, said permanent magnet means forming part of a pendulum, and abutment means for blocking one deflection direction of the pendulum.

9. An installation according to claim 8, wherein an adjusting screw is coordinated to the pendulum on each side, one of said adjusting screws serving as blocking abutment means and the other for the adjustment of the switching path.

10. An installation according to claim 9, wherein a steel adjusting screw is coordinated to the suspended permanent magnet means on the blocked deflection side.

11. An installation according to claim 10, wherein an amplifier means is interconnected between the pulse transmitter means and the magnetic valve means.

12. An installation according to claim 11, wherein said amplifier means is a transistorized amplifier.

13. An installation according to claim 12, wherein the transverse acceleration, at which the pulse transmitter means will respond, is adjustable.

14. An installation according to claim 1, wherein each magnetic valve means includes a two-way valve means closing upon energization thereof and disposed in the brake-pressure line means leading to the corresponding wheel brake and a two-way valve means opening upon energization thereof and disposed in the line means leading from the wheel brake to the accumulator means.

15. An installation according to claim 14, wherein the transverse acceleration, at which the pulse transmitter means will respond, is adjustable.

16. An installation according to claim 1, wherein each magnetic valve means includes a three-way valve means which upon energization thereof switches the wheel-brake from the brake-pressure line means to the accumulator line means.

17. An installation according to claim 1, wherein a control piston means is arranged in each brake-pressure line means, said control piston means being held in its open position by a spring force and being movable into its closing position by actuation with the brake-pressure by way of a magnetic valve means opening upon energization thereof.

18. An installation according to claim 17, wherein said control piston means is provided with a longitudinal bore and is operatively connected with the accumulator means on the side thereof actuated by the spring force.

19. An installation according to claim 18, wherein a line branches off from the brake-pressure line means between said control piston means and the respective wheel brake which leads back to the control piston means by way of said magnetic valve means.

20. An installation accorning to claim 19, wherein the transverse acceleration, at which the pulse transmitter means will respond, is adjustable.

21. An installation according to claim 1, wherein a common accumulator means is provided for the magnetic valve means at both rear wheels which is operatively connected by way of a common check valve means with a brake-pressure line means leading to a magnetic valve means.

22. An installation according to claim 1, wherein said accumulator means is constructed as differential accumulator, spring force means loading said differential accumulator means, and means for additionally loading said differential accumulator means by the brake-pressure.

23. An installation according to claim 22, wherein said accumulator means includes two-step piston means, the cylinder space coordinated to the piston means with the larger surface being operatively connected with a magnetic valve means and the cylinder space coordinated to the smaller piston surface being operatively connected with the brake-pressure line means.

24. An installation according to claim 1, wherein said accumulator means has a volume which amounts to a multiple of the actuating volume of each wheel brake.

25. An installation according to claim 24, wherein said volume amounts about to four to six times the actuating volume of each wheel brake.

References Cited

UNITED STATES PATENTS 3,035,869 5/1962 Francia _____ 303—24 X
3,398,991 8/1968 Compton _____ 303—7

MILTON BUCHLER, Primary Examiner

J. J. McLAUGHLIN, JR., Assistant Examiner

U.S. Cl. X.R.

188—181; 303—6, 24